Jan. 8, 1924.                                                1,479,990
                        A. KEYS
                 AUTOMATIC SILAGE FEEDER
              Filed Aug. 9, 1920          3 Sheets-Sheet 1
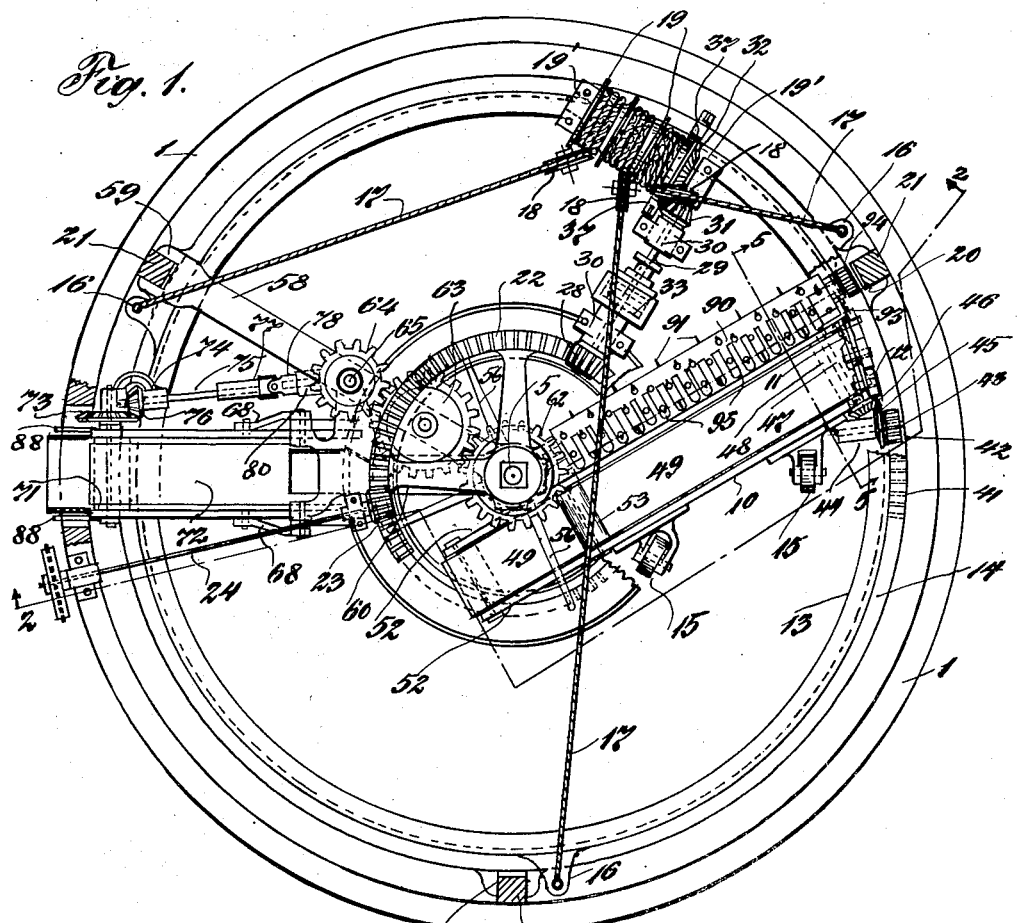
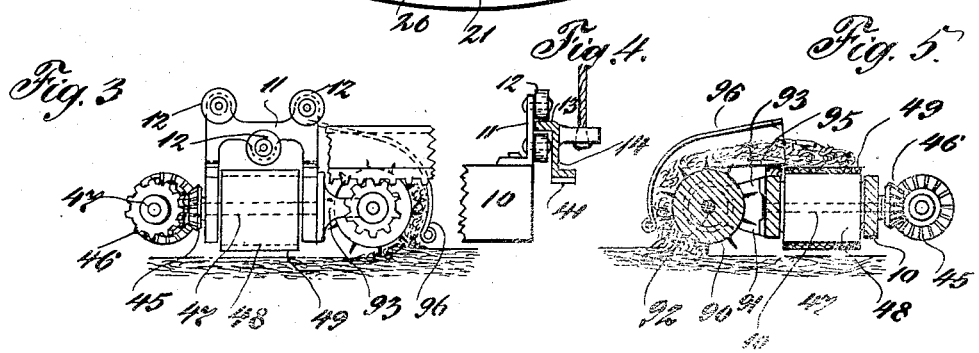
Inventor
Alvin Keys.

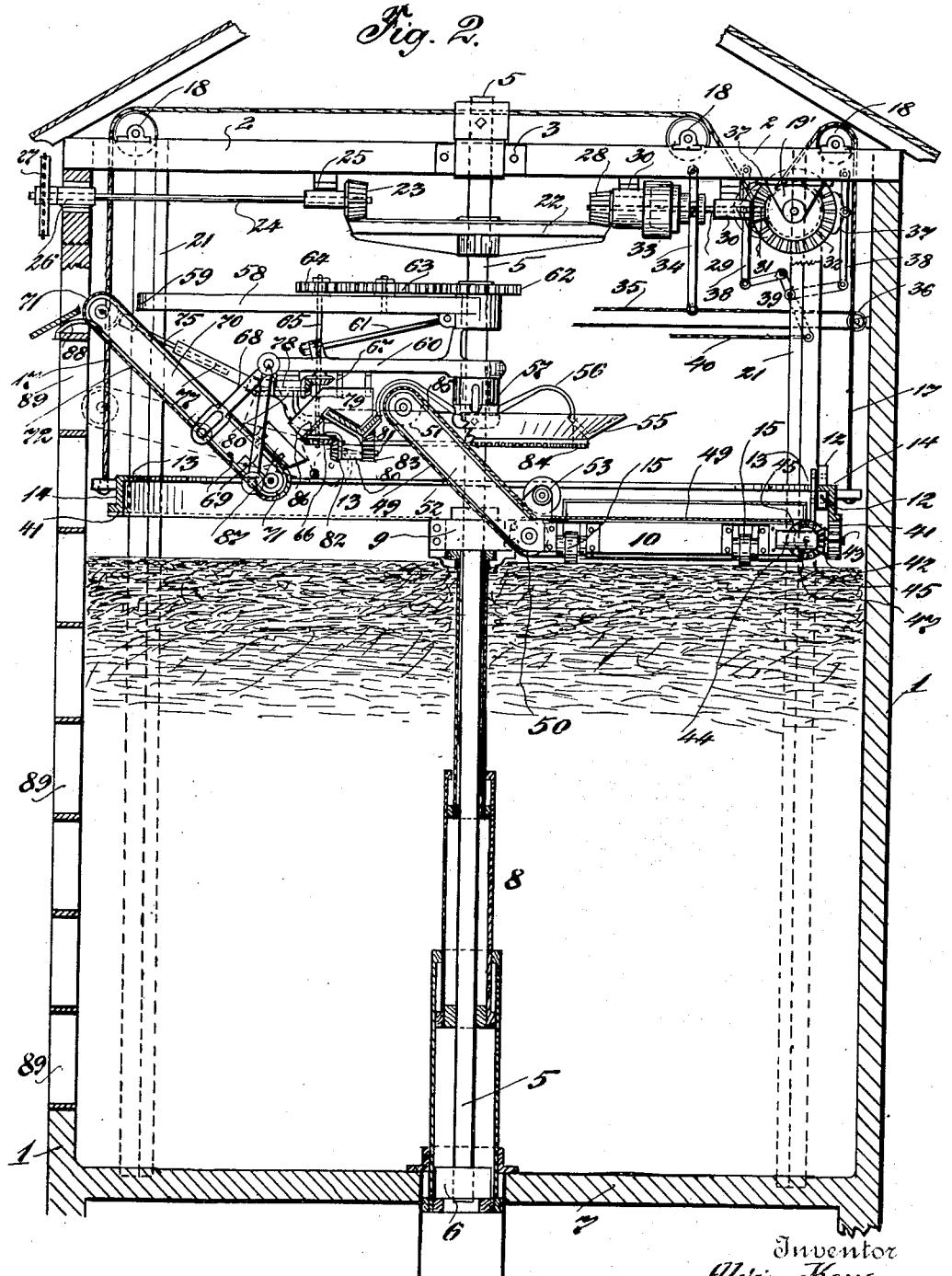

Jan. 8, 1924.
A. KEYS
AUTOMATIC SILAGE FEEDER
Filed Aug. 9, 1920
1,479,990
3 Sheets-Sheet 3
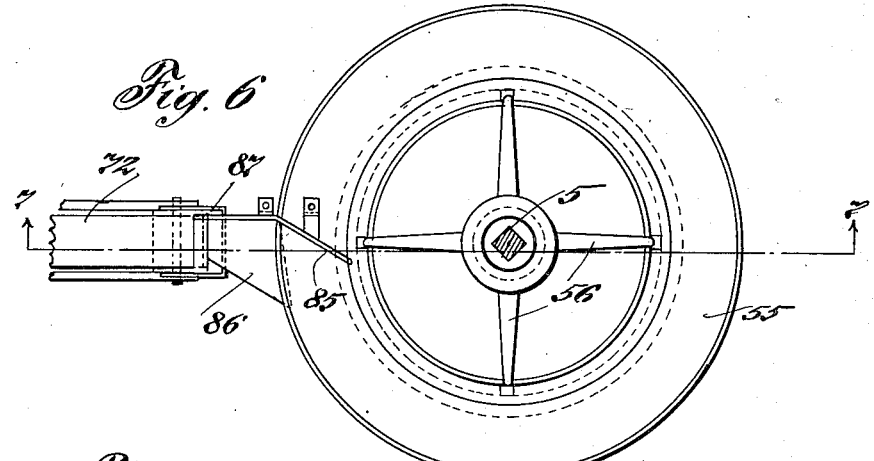
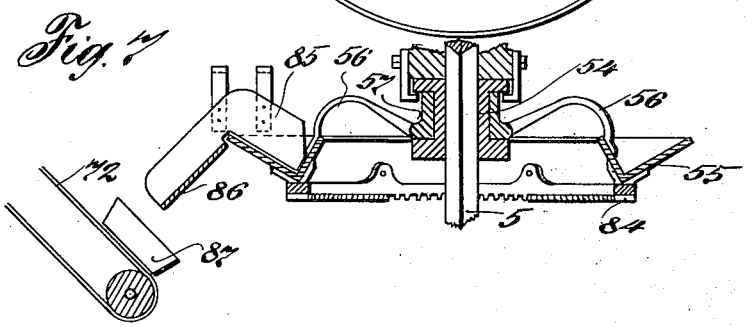
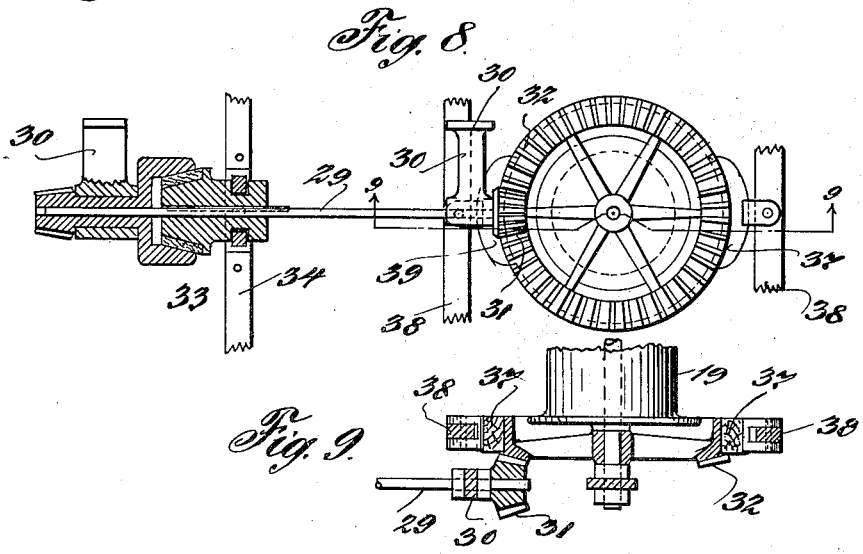
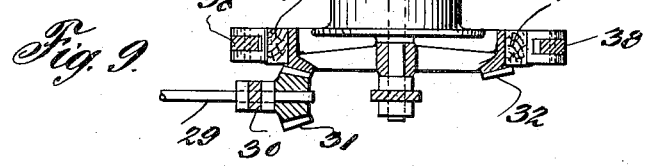
INVENTOR.
Alvin Keys.
BY
his ATTORNEY Patented Jan. 8, 1924.

1,479,990

UNITED STATES PATENT OFFICE.

ALVIN KEYS, OF MARLETTE, MICHIGAN.

AUTOMATIC SILAGE FEEDER.

Application filed August 9, 1920. Serial No. 402,176.

*To all whom it may concern:*

Be it known that I, ALVIN KEYS, a citizen of the United States, and resident of Marlette, in the county of Sanilac and State of Michigan, have invented certain new and useful Improvements in Automatic Silage Feeders, of which the following is a specification.

This invention relates to silos, more particularly automatic silage feeding and distributing devices, the object thereof being the provision of means for automatically gathering silage from the top layers of a charged silo and laterally discharging the same at any level, whereby the necessity of constantly climbing ladders is obviated and silage may be disbursed in any desirable quantity.

In carrying out my invention I employ in connection with a silo having a plurality of lateral outlets or doorways; a vertical shaft, means for rotating and mounting said shaft a reciprocating and swinging sweeper and picker, a carriage therefor and means for mounting the same in slidable relation with said shaft, a silage conveyor suported by said carriage, a rotary hopper for receiving silage from said conveyor, an elevator for carrying silage from said hopper to the doorways of the silo, means for suspending, raising and lowering the said parts, and gearing and driving means for operating the device, and other novel features, all as hereinafter fully described and specifically set forth in the annexed claims.

In the accompanying drawings forming part of this specification, Figure 1 is a plan view of my improved apparatus. Fig. 2 is a vertical sectional view taken on the line 2—2 of Fig. 1. Fig. 3 is an end view of a swinging carriage and rotary picker forming part of the invention. Fig. 4 is a side view of one end of said carriage. Fig. 5 is a cross section of said carriage and picker taken on the line 5—5 of Fig. 1. Fig. 6 is a plan view of a rotary hopper forming part of the device and parts adjacent thereto. Fig. 7 is a sectional view taken on the line 7—7 of Fig. 6. Fig. 8 is a detail view, partly in section, of part of the device; and Fig. 9 is a sectional view taken on the line 9—9 of Fig. 8.

In the practice of my invention I fix across the top of a silo 1 a cross beam 2, having fixed thereto a bearing or journal box 3, through which is journaled the upper end of a vertical shaft 5, which extends throughout the full length of the silo and is journaled at its lower end in a box 6, fixed to the floor 7 of the silo, this said shaft is square in cross section throughout the major part of its length and round at its ends for rotatable engagement with said boxes.

Surrounding said shaft 5 is a telescopic protective casing 8, which is fixed at one end to a box 9 forming part of and extended laterally from a sweeping carriage 10, said box being in slidable relation with the squared shaft 5, whereby rotation of said shaft swings said carriage around its axis and on a horizontal plane and said carriage may have either downward or upward movement.

To the free or outer end of the carriage 10, is fixed a hanger 11, having roller-bearings 12 which engage an inwardly directed annular flange 13 of a suspension ring 14, said flange making a rail for carrying the roller-bearings 12 of the hanger 11, to maintain the carriage 10 in horizontal position as it sweeps over the surface of the silage; the carriage 10 is further provided with a plurality of traction wheels 15, which bear on the surface of the silage. The ring 14 has a plurality of lugs 16 extended radially therefrom, these lugs engage the ends of cables 17, which wind over guide sheaves 18 and around a drum 19, carried by hangers 19' depending from the beam 2; said ring 14 is further provided with a plurality of vertically grooved radial extensions 20 which are in slidable engagement with upright guide rails 21, extended vertically on the inner walls of the silo, whereby said ring may travel upwardly and downwardly.

Fixed near the upper end of the shaft 5 is a bevel-gear wheel 22, which meshes with a bevel-gear pinion 23 of a driving shaft 24, which is journaled through a hanger 25 and a box 26, the outer end of said shaft extending laterally from the silo and having fixed thereto a sprocket wheel 27, adapted for engagement with a chain for connection with a motor, whereby the mechanism may be actuated, as hereinafter described.

As a means for rotating the drum 19, whereby the ring 14 and its connected parts may be raised and lowered, I provide a bevel-gear pinion 28, which meshes with the gear wheel 22, and is fixed to the loose member of a clutch 33, mounted on a horizontal shaft 29, which is carried by suitable hangers 30 depending from the beam 2, said shaft 29 also having a fixed bevel-gear pinion 31, which meshes with a bevel-gear wheel 32 fixed to the drum 19. The clutch 33 is interposed between the pinions 28 and 31, and said clutch is adapted to be operated by a lever 34 and a rope or chain 35 which engages around a pulley 36 and leads to any point of convenience wherefrom the clutch may be operated to alternately rotate and suspend rotation of the drum 19. I also provide a brake for retarding rotation of the drum 19, said brake comprising the shoes 37, swinging on levers 38, and a compound lever 39 adapted for operation by a rope 40, which may lead to any point outside of the silo. Fixed to the under edge of the ring 14 is an annular rack 41, which meshes with a pinion 42 of a shaft 43, journaled in a box 44 of the carriage 10, said shaft 43 also having fixed thereto a bevel gear wheel 45, which meshes with a similar bevel wheel 46 of a shaft 47, which carries a roller 48 extended transversely across the end of the carriage adjacent to the hanger 11. Engaging around the roller 48 is an endless belt or conveyor 49, which extends horizontally across a roller 50 and thence upwardly at an angle to and around a roller 51, mounted on a shaft extended between arms 52 of the carriage 10. Over the roller 50 is a presser-roller 53, which maintains the belt 49 in taut condition and feeds silage to the upwardly extended part of the belt-conveyor 49.

Rotatably engaging a sliding sleeve 54 of the shaft 5, is a circular hopper 55, embodying arched spokes 56 and a hub 57, which bears around the sleeve 54. Over the sleeve 54 and loosely engaging around the shaft 5, is a bracket embodying an arm 58, having a bifurcated end 59 which engages one of the uprights 21, and an arm 60, said arms held together by a brace 61.

Over the arm 58 is a train of gear wheels comprising a wheel 62, in slidable engagement with the shaft 5, and idler gear wheel 63 and a gear wheel 64, which is mounted on a vertical shaft 65, said shaft extends through the two arms of the hanger and has fixed to its lower end a bevel-gear wheel 66 and at an intermediate point a bevel-gear wheel 67.

In pivotal relation with the arm 60 is a swinging hanger embodying the diverging arms 68 and 69. This hanger carries a silage elevator comprising a frame 70, rollers 71 and an endless belt 72.

As a means for operating the said elevator a bevel-gear wheel 73 is fixed to the shaft of its upper roller 71, said shaft being further provided with a hanger 74 through which is journaled a shaft section 75 having a bevel-gear wheel 76, said shaft section is in telescopic engagement with a tubular shaft section 77 which is swiveled to a shaft section 78 having a bevel-gear wheel 79 fixed thereto, said gear wheel meshing with the gear wheel 67. The shaft section 78 extends horizontally through a hanger 80 which depends from the arm 60, said hanger also journaling the lower end of the shaft 65 and having a horizontal extension 80' through which passes a shaft 81, having on one end a bevel-gear wheel 82, and on the other end a pinion gear-wheel 83, said last named wheel meshing with an annular rack 84 of the hopper 55, whereby said hopper may be rotated.

Extended within the hopper 55 and depending from the arm 60, is a scraper 85 having a chute 86 for conducting silage from the hopper and discharging it on a trough 87, from whence it passes to the endless carrier 72, embodying the elevator means for discharging silage through the doorways of the silo.

The supporting frame 70 of the endless elevator 72 is provided with resilient supporting legs 88, for engagement with the sills of the doorways 89 when the device is being operated, whereby said sills may not contact with the endless belt 72 to retard its operation.

As a means for feeding silage to the endless belt 49 of the carriage 10, I provide a rotary picker 90, having a plurality of radial spurs 91, the said picker is fixed to a shaft 92, which is journaled through hangers 93 of the carriage 10, said shaft 92 having on its outer end a pinion 94 which meshes with the rack 41 of the ring 14, whereby as the carriage 10 swings around the axis of the shaft 5 the picker 90 is rotated.

Over the picker 90 is a comb-like stripper 95 and a hood 96, making a passageway for conducting the picked silage to the conveyor-belt 49.

In the operation and use of the invention, the ring 14 and its connected parts are lowered until the traction wheels 15 bear on the surface of the silage, as shown by Fig. 2 of the drawings, rotary movement is then imparted to the drive shaft 5 by means of the bevel-gear wheels 22, 23, through the medium of the sprocket wheel 17, which is connected by a suitable chain to the fly wheel of an adaptable motor placed at any desirable location outside of the silo. This movement of the shaft 5 swings the carriage 10 and the rotary picker 90 around the axis of said shaft in the direction of the shafts rotation, the hopper 55 being rotated in an opposite direction by means of the transmission gear wheels 62, 63, 64, 66, 82 and 83; rotary movement being transmitted to the picker 90 through the pinion 93, which is rotated by means of the rack 41, said rack also employed to transmit motion to the gearing for actuating the carrier 49. As the picker sweeps over the silage it gathers particles thereof and passes them to the belt 49, said belt carrying them upwardly and discharging them into the hopper 55, from whence they are scraped, by means of the fixed scraper 85, and delivered to the elevator-belt 72 and discharged laterally through the doorways of the silo, said elevator being actuated by means of the gear wheels 67, 79, 76 and 73. As the surface of the silage is lowered by the removal of its upper layers the ring 14 and the slidable parts on the shaft 5 are lowered until the carriage 10 again contacts with the surface, the operation being repeated until the silo is emptied, or until any required amount of silage is gathered and discharged therefrom.

By means of the above described device it is manifest that I provide efficient means for automatically gathering and discharging silage from a silo without necessity of employing excessive manual labor. I do not however wish to confine myself to the specific mechanical construction of parts as hereinabove described, as under the spirit and scope of my invention I believe I may employ certain equivalents and variations without departing from the spirit and scope of my invention.

Having thus described my invention, what I claim as new and desire to secure by Letters Patent, is:

1. An automatic silage feeder comprising a sweeping picker, a hopper, elevator-means for conducting silage to said hopper, and elevator-means for conducting silage away from said hopper, and means for mounting and actuating said parts.

2. An automatic silage feeding device comprising a vertically slidable sweeper and picker adapted to swing around a vertical axis on a horizontal plane, silage conveying and elevating means for receiving silage from said picker, a hopper for receiving silage from said elevating means, an elevator for receiving and conveying silage laterally away from said hopper, and means for mounting and actuating said parts.

3. An automatic silage feeding device comprising a vertically slidable sweeper and picker, and a shaft for carrying said sweeper and picker, said sweeper and picker adapted to swing around the axis of said shaft and gather silage from a horizontal surface, silage conducting and elevating means, a rotary hopper for receiving silage from said elevating means, scraper means for removing silage from said hopper, chute means for conducting said silage, and elevator means for laterally discharging said silage, and means for actuating and mounting said parts, and means for suspending and raising and lowering said parts.

4. An automatic silage feeding device comprising a vertically slidable rotary picker, a horizontal swinging carriage for said picker, a vertical shaft slidably supporting said carriage, said carriage and picker adapted to swing around the axis of said shaft whereby said picker may gather silage from a horizontal surface, elevator means for conducting silage from said picker, a rotary hopper for receiving silage from said elevator means, scraper means for removing silage from said hopper, chute means for conducting said silage, and conveyor and elevator means for laterally discharging said silage, and gear-wheel and pinion means for operating said parts, and means for suspending and controlling the movements of said parts.

5. The combination, with a silo having a plurality of lateral door-ways or outlets, of a silage feeding device comprising a vertically slidable sweeper and picker adapted to be swung around a vertical axis on a horizontal plane, silage elevating means for receiving silage from said picker, a rotating hopper for receiving silage from said elevating means, conveyor-elevator means for receiving and carrying silage laterally away from said hopper, and means for mounting and operating the parts whereby they act in unison.

6. The combination, with a silo having a plurality of lateral doorways arranged in vertical alignment, of a silage feeding device comprising a vertically slidable sweeper and picker and means for rotating said sweeper, and a vertical shaft for carrying said sweeper, said sweeper and picker adapted to swing around the axis of the said shaft whereby said picker may gather silage from a horizontal surface, silage conducting and elevating means adjacent to said picker, a rotary annular hopper for receiving silage from said elevating means, scraper means for removing silage from said hopper, chute means for conducting said silage, and conveyor and elevator means for laterally discharging said silage, and means for mounting and actuating the moving parts of the device.

7. The combination, with a silo having a plurality of lateral doorways arranged in vertical alignment, of a silage feeding device comprising a rotary picker, a swinging carriage for said picker, a vertical shaft for carrying said carriage, said carriage and picker adapted to swing around the axis of said shaft whereby said picker may gather silage from a horizontal surface, elevator means for conducting silage from said picker, an annular rotary hopper for receiving silage from said elevator means, a scraper for removing silage from said hopper, chute means for conducting said silage, and conveyor and elevator means for receiving silage from said chute means and laterally discharging same through the doorways of the silo, and gear-wheel and pinion means for operating the rotatable parts, and means for mounting said parts, and means for suspending the device whereby it may be maintained at various levels, and control means for said suspending means.

8. An automatic silage feeding device comprising a vertically slidable sweeper and picker adapted to swing around a vertical axis on a horizontal plane, silage conveying and elevator means, an annular rotary hopper for receiving silage from said elevator means, means for removing and conveying silage from said hopper, and means for mounting and actuating said parts.

9. An automatic silage feeding device comprising a vertically slidable horizontally rotatable sweeper and picker, a vertical shaft, and means for rotating said shaft, and an annular rotary hopper, said sweeper and picker and said hopper in slidable engagement with said shaft, and elevator means for conducting silage to said hopper, and elevator means for conducting silage away from said hopper, and means for actuating said elevators, and means for rotating said shaft.

Signed at Marlette, in the county of Sanilac and State of Michigan, this 16th day of June, A. D. 1920.

ALVIN KEYS.